United States Patent
Schaferskupper et al.

(10) Patent No.: US 9,562,138 B2
(45) Date of Patent: Feb. 7, 2017

(54) METHOD FOR SEPARATING VOLATILE SUBSTANCES FROM MATERIAL MIXTURES AND DEVICE FOR PRODUCING POLYARYLENE SULFIDES

(71) Applicant: SK CHEMICALS CO., LTD., Seongnam-si (KR)

(72) Inventors: Clifford Schaferskupper, Saalfeld/Saale (DE); Thomas Hille, Berlin (DE); Theodor Jurgens, Castrop (DE); Andre Schumann, Berlin (DE); Lars Gierszewski, Berlin (DE); Il Hoon Cha, Seongnam-si (KR); Sung Gi Kim, Seongnam-si (KR); Yoon Cheol Kim, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 0 days.

(21) Appl. No.: 15/181,136

(22) Filed: Jun. 13, 2016

(65) Prior Publication Data

US 2016/0355640 A1   Dec. 8, 2016

Related U.S. Application Data

(60) Division of application No. 14/860,207, filed on Sep. 21, 2015, which is a continuation of application No.
(Continued)

(30) Foreign Application Priority Data

Apr. 30, 2012   (EP) .................... 12166195

(51) Int. Cl.
C08G 75/00 (2006.01)
C08G 75/02 (2016.01)
B01J 19/24 (2006.01)

(52) U.S. Cl.
CPC .......... *C08G 75/0281* (2013.01); *B01J 19/245* (2013.01); *C08G 75/0209* (2013.01); *C08G 75/0263* (2013.01); *B01J 2219/24* (2013.01)

(58) Field of Classification Search
CPC ... C08G 75/14; C08G 75/025; C08G 75/0281; C08F 6/28
See application file for complete search history.

(56) References Cited

U.S. PATENT DOCUMENTS

| | | | |
|---|---|---|---|
| 3,356,763 A | 12/1967 | Dollinger et al. | |
| 4,746,758 A | 5/1988 | Rule et al. | |

(Continued)

FOREIGN PATENT DOCUMENTS

| | | |
|---|---|---|
| CN | 1583821 | 2/2005 |
| CN | 1649937 | 8/2005 |

(Continued)

OTHER PUBLICATIONS

U.S. Appl. No. 15/181,098, filed Jun. 13, 2016, Schaferskupper et al.

(Continued)

*Primary Examiner* — Shane Fang
(74) *Attorney, Agent, or Firm* — Sheridan Ross P.C.

(57) ABSTRACT

The present invention relates to a method for separating volatile substances, particularly iodine, diiodized aromatic compounds and/or mixtures thereof, from material mixtures containing said compounds. The invention further relates to a device for producing polyarylene sulphides, by means of which volatile substances, particularly iodine and diiodized aromatic compounds, can be separated from the polymers.

15 Claims, 2 Drawing Sheets

Related U.S. Application Data

Figure 1:
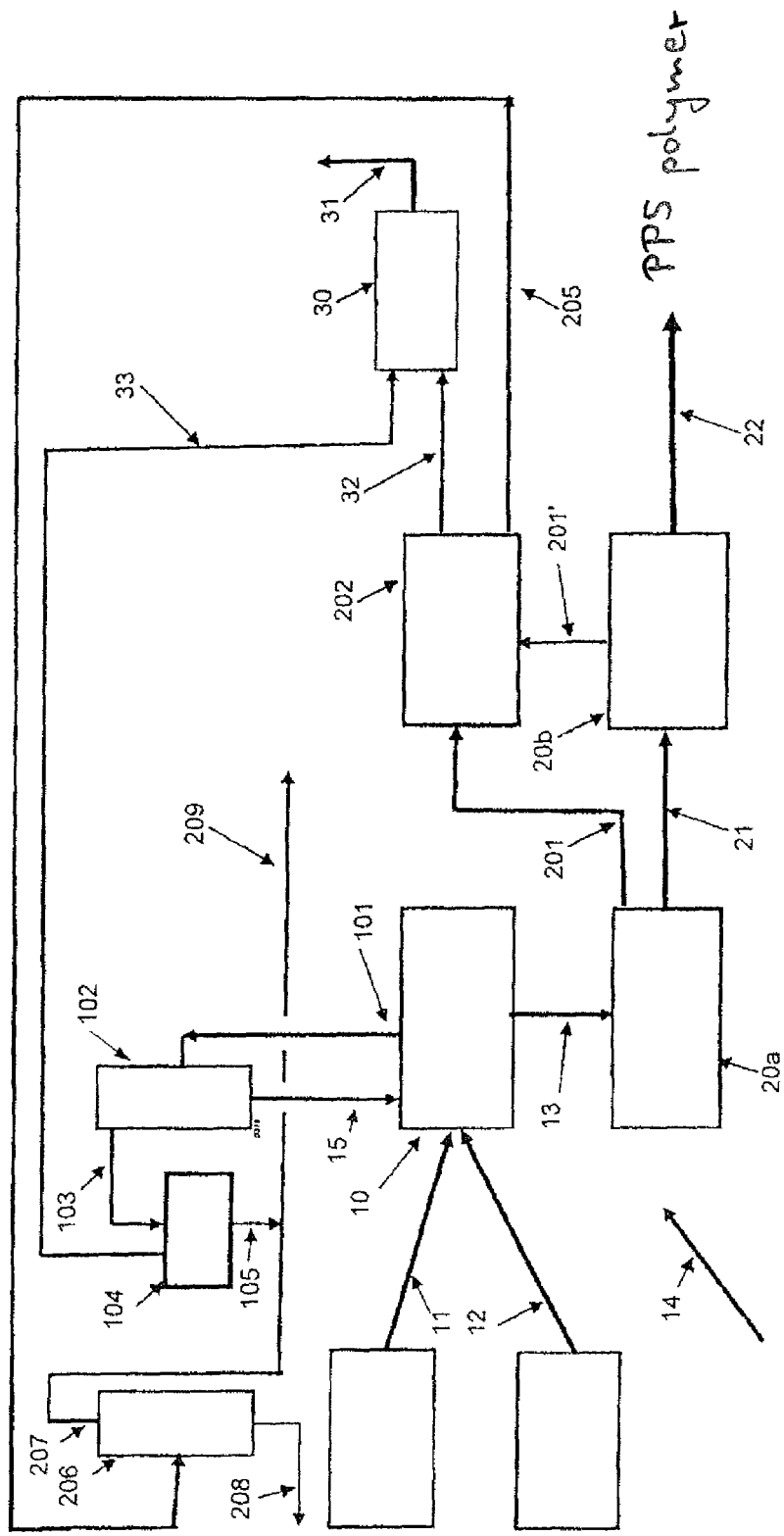

14/397,581, filed as application No. PCT/EP2013/058841 on Apr. 29, 2013, now abandoned.

(56) References Cited

U.S. PATENT DOCUMENTS

| | | | |
|---|---|---|---|
| 4,786,713 | A | 11/1988 | Rule et al. |
| 5,648,437 | A | 7/1997 | Fischer et al. |
| 2009/0203872 | A1* | 8/2009 | Lee .................... C08G 75/0213 528/373 |
| 2010/0105845 | A1 | 4/2010 | Lee et al. |
| 2015/0126705 | A1 | 5/2015 | Schaferskupper et al. |
| 2016/0096929 | A1 | 4/2016 | Schaferskupper et al. |

FOREIGN PATENT DOCUMENTS

| | | |
|---|---|---|
| CN | 1668674 | 9/2005 |
| CN | 102317353 | 1/2012 |
| DE | 10155419 | 5/2003 |
| DE | 10351085 | 6/2005 |
| EP | 0488268 | 6/1992 |
| EP | 1493772 | 1/2005 |
| WO | WO 2007/140926 | 12/2007 |
| WO | WO 2010/093734 | 8/2010 |

OTHER PUBLICATIONS

International Search Report for (PCT) Application No. PCT/EP2013/058841, mailed Mar. 12, 2014, 7 pages, with English translation.

Written Opinion for (PCT) Application No. PCT/EP2013/058841, mailed Mar. 12, 2014, 9 pages, with English translation.

International Preliminary Report on Patentability for (PCT) Application No. PCT/EP2013/058841, mailed Nov. 13, 2014, 7 pages.

Official Action for U.S. Appl. No. 14/397,581 mailed Feb. 5, 2016, 5 pages Restriction Requirement.

Official Action for U.S. Patent Application No. 14/860,207 mailed Feb. 8, 2016, 5 pages Restriction Requirement.

Official Action for U.S. Appl. No. 14/860,207, mailed Jun. 16, 2016 6 pages.

* cited by examiner

METHOD FOR SEPARATING VOLATILE SUBSTANCES FROM MATERIAL MIXTURES AND DEVICE FOR PRODUCING POLYARYLENE SULFIDES

CROSS REFERENCE TO RELATED APPLICATIONS

This application is a Divisional of U.S. patent application Ser. No. 14/860,207 filed Sep. 21, 2015, which is a Continuation of U.S. patent application Ser. No. 14/397,581 filed Oct. 28, 2014, which is a national stage application under 35 U.S.C. §371 and claims the benefit of PCT Application No. PCT/EP2013/058841 having an international filing date of Apr. 29, 2013, which designated the United States, which PCT application claimed the benefit of European Patent Application No. 12166195.3 filed on Apr. 30, 2012, the disclosures of each of which are incorporated herein by reference.

The present invention relates to a method for separating volatile substances, in particular iodine, di-iodized aromatic compounds and/or mixtures thereof from material mixtures which include these compounds. The present invention further relates to an apparatus for the production of polyarylene sulfides with the aid of which volatile substances, in particular iodine and di-iodized aromatic compounds can be separated from the polymerizates.

In condensation polymerization processes at least one reaction product arises during the chemical reaction which has to be removed from the process in order to generally even enable the build-up of macro-molecules.

This reaction product is, however, nearly always mixed with at least one further substance for "reasons of equilibrium" which substance is normally gaseous and as a monomer and/or input material can even participate with the build-up of the macro-molecule and which should thus be fed back into the process as soon as possible.

Methods, such as e.g. polyester condensation polymerization method are known with which, with the aid of "classical" methods such as rectification, reverse osmosis, pervaporation etc., the reaction products such as water or methanol and/or THF from the process are discharged.

The chemistry and/or the process parameters for manufacturing PPS (polyphenylene sulfides) and/or PAS (polyarylene sulfides) by means of p-DIB and elementary sulfur is, for example described in the following patents:

U.S. Pat. No. 4,786,713 (Copolyarylene sulfide-disulfide)
US 2009/0203872 (Manufacturing process for polyarylenesulfide);
US 2010/0105845 (Method for production of polyarylene sulfide resin with excellent luminosity and the polyarylene sulfide resin),
U.S. Pat. No. 4,746,758 (Process for preparing iodinated aromatic compounds).

In these patents the chemistry of the manufacture of polyphenylene sulfides and/or polyarylene sulfides is described.

In the U.S. Pat. No. 4,786,713 already in the year 1988 a method including statements of process parameters is described starting from elementary sulfur and para-diiodobenzene in order to synthesize the polymer PAS.

In the U.S. Pat. No. 4,786,713 of the year 1988 the corrosive iodine is removed from the solidified final product by means of hot inert gas and/or vacuum, whereas in the patents of SKC the iodine is caught through the addition of terminator additives towards the end of the chemical process in order to minimize the iodine content in the final product.

In this connection an iodine content of less than 1000 ppm should be achieved in the final product in order to minimize and/or to prevent latter corrosion by the final product.

The substances arising in the process, such as the iodine and p-DIB (para-di-iodobenzene) are comparatively expensive, such that an efficient separation of the above components in a direct feedback, particularly of the p-DIB, into the condensation polymerization process is very important for the economic efficiency and material losses must be minimized. It is thus true that p-DIB should be supplied back into the process in an as complete as possible manner and to exclude the expensive and environmentally dangerous iodine as loss-free as possible for the purpose of further processing. The discharged iodine is substantially "transformed" in a different method which is referred to as "transiodination", to the p-DIB required for the polymer method.

Iodine containing gas mixtures from the condensation polymerization process which are extracted at pressures lying beneath the triple point of the iodine can be exclusively desublimated. For these reasons, the "typical" process units, such as rectifiers, pervaporations etc. are no longer applicable there.

In addition to this it is particularly difficult that iodine is extremely corrosive particularly at a high purity level and necessitates particularly expensive materials for corresponding reactors and different types of equipment.

For particularly corrosive substances, such as is the case for iodine, extremely expensive materials, such as e.g. Hastelloy and others have to be used.

Since desublimation of iodine and p-DIB mixtures take place in vacuums having the order of magnitude of 1 mbar absolute pressure, the requirements and the vacuum tightness are very high and require particular method components and measures.

It is moreover problematic that, beneath certain pressures and temperatures as well as supercoolings of the substances to be desublimated, these are separated in the most different shapes and modifications depending on the operation and kind of the apparatus. These structures can have a comparatively high or also very low density which significantly influences the heat transfer and thus heat exchanger surfaces. In this connection particular modes of operation amongst other things of the desublimation temperatures are important for the purpose of minimization of the contact surfaces in the desublimators.

Starting here from, it is thus the object of the present invention to provide a method which enables an as efficient as possible separation of arising side products, for example iodine, as well as of non-reacted reactants on the manufacture of polyarylene sulfides. Likewise it is the object of the present invention to provide an apparatus which enables an as efficient as possible separation of the previously described substances from a polymer melt and/or a prepolymer melt.

This object is satisfied with regard to the method having the features of the patent claim 1 as well as with regard to the apparatus having the features of the patent claim 9 as well as the method for producing a polyarylene sulfide having the features of claims 17. The respective dependent patent claims in this connection represent advantageous embodiments.

In accordance with the invention thus a method for separating iodine of at least one di-iodized aromatic compound in accordance with the general formula II I-A-I                                                    formula II, (where A represents a bivalent aromatic radical) and/or mixtures thereof, from material mixtures comprising iodine and/or the at least one di-iodized aromatic compound in accordance with the general formula II, is provided, wherein
a) a first part of the iodine, the at least one di-iodized aromatic compound in accordance with the general formula II, and/or the mixture thereof is/are separated at a pressure which is equal to or larger than the pressure which is present at the triple point of iodine; and
b) a second part of the iodine, the di-iodized aromatic compound in accordance with the general formula II, and/or the mixture thereof is/are separated at a pressure which is smaller than the pressure which is present at the triple point of iodine;
wherein in both steps a) and b) the material mixture respectively has temperatures at which at least iodine is present in a gaseous state at the said pressures.

Thus, not only a condensation polymerization process per se is the subject matter of the method underlying the invention, but rather the method steps specifically adjoining this process which further treat, discharge and/or feedback the reaction products and the still usable reactants which escape the main process e.g. a condensation polymerization in vapor form for reasons of equilibrium.

Thus, substances are separated which e.g. accrue during a condensation polymerization process and/or do not react during a condensation polymerization process during which elemental sulfur and e.g. p-DIB (para-di-iodobenzene) are built up to a macro-molecule. In this connection reaction products arise such as predominantly iodine, which together with possibly present reactants, such as for example p-DIB, leave the individual process steps at various pressures and temperatures in the gaseous state and are separated.

In the course of the consecutive process steps and with an advancing reaction during which the pressures sink and the temperatures increase the substances accrue in different compositions and amounts at different points of the condensation polymerization method.

That/Those process unit(s) which process(es) the separated reaction products which are mixed with at least one of the materials of use, have to feed back the substances still "capable of reaction" as purely as possible into the process and have to discharge the substances no longer required for the macro-molecular build-up from the method to an as large as possible extent.

Moreover, the invention provides an apparatus which builds up the macromolecules and at the same time treats the iodine/p-DIB-gas flows which accrue during the condensation polymerization process which, at normal mean and also very low pressures, i.e. at vacuums of e.g. 1 mbar and less, are discharged from the condensation polymerization steps.

Only the specific method guidance and/or the associated apparatus which treats these different gas flows in a new kind and manner enables larger and in particular continuous plants to be operated efficiently and cost-effectively.

In accordance with the invention it is thus provided that arising iodine as well as possibly non-reacted di-iodized aromatic compounds which are used as reactants can be separated from the arising polymer flows and/or prepolymer flows at at least two different positions of the process for a condensation polymerization method in which the di-iodized aromatic compound is condensed by polymerization with iodine to the corresponding polyarylene sulfides. In the event that iodine is simultaneously present beside non-reacted reactants (di-iodized aromatic compound) in accordance with the present method it is likewise possible to separate mixtures of iodine and the di-iodized aromatic compound from the corresponding polymer flows and/or prepolymer flows.

In this connection it is essential for the invention that the separation takes place at at least two different positions of the prepolymer flow and/or polymer flow. At a first position in this connection method conditions are present at which at least the pressure lies at or above that of the triple point of iodine, this means that the pressure amounts to 126 mbar (absolute pressure); at the same time sufficiently high temperatures of the material mixture from which the said substances should be separated is present such that at least the iodine is present in a gaseous aggregate state.

A further extraction of the iodine and of the di-iodized aromatic compound and/or the mixtures thereof takes place at a further position, wherein conditions are present at which at least the pressure lies below the pressure present at the triple point of the iodine, this means the pressure amounts to preferably <126 mbar (absolute pressure), wherein the material mixture from which the said substances should be separated, however, has a sufficiently high temperature so that at least the iodine is present in a gaseous state at the said pressure conditions.

However, it is likewise possible and covered by the invention that the said separation steps, i.e. the separation of the first part and/or of the second part of the previously mentioned conditions are carried out a plurality of times, this means that a plurality of separations takes place, this means a separation is carried out at different subsequent positions of the above-mentioned substances at the pressure conditions such as they are described for the first part of the separation are carried out; furthermore, also a multiple separation of the above said substances is possible at those conditions such as they are described for the second part of the separation.

It has surprisingly been found that a very efficient separation of iodine, a di-iodized aromatic compound of the formula II and/or mixtures thereof from material mixtures is possible by means of the method in accordance with the invention, so that the material mixtures can be freed nearly completely or totally (this means beneath the detection limit) of iodine and/or di-iodized aromatic compounds. At the same time it has been shown that in accordance with the method in accordance with the invention a high feedback quota with respect to iodine and/or the di-iodized aromatic compound can be achieved.

In a preferred embodiment the material mixture from which the iodine, the di-iodized aromatic compound in accordance with the general formula II and/or mixtures thereof should be separated, includes polyarylene sulfides which include at least one repeat unit in accordance with the general formula I

    formula I, (where A represents a bivalent aromatic radical) and/or includes prepolymers thereof. Likewise a separation of prepolymers of this polyarylene sulfide is possible. Preferably the polymers and/or prepolymers of the equation I are terminated with hydrogen.

In accordance with the invention polymers are understood as polyarylene sulfides which have more than 10 repeat units, preferably 10 to 300 repeat units, particularly preferably 100 to 200 repeat units; prepolymers of polyarylene sulfides in contrast thereto represent substances which have a repeat unit in accordance with formula I which have up to 10, preferably less than 5 repeat units. Preferably a prepolymer of the formula I thus has a viscosity of 0.1-10 Pas (1-100

Poise) whereas the preferred viscosity of the polymers in accordance with formula I has at least 15 to 400 Pas (150-4000 Poise), preferably however 75-200 Pas (750 2000 Poise). The viscosity is determined in accordance with MFI Melt Flow Index DIN EN ISO 1133.

The previously mentioned prepolymers and polymers which include the repeat units in accordance with formula I are generally terminated with hydrogen.

For this reason the method in accordance with the invention is particularly suitable for the separation of iodine and/or of di-iodized aromatic compounds of the general formula II from condensation polymerization reactions in which polyarylene sulfide are produced by condensation polymerization of the di-iodized aromatic compound of the general formula II and sulfidation reagents, for example sulfur or alkali sulfides. This particular method guidance thus enables the production of highly pure polyarylene sulfides, at the same time a quasi-complete separation of the arising condensate (iodine) as well as possibly non-reacted reactants (di-iodized aromatic compounds in accordance with the general formula II) can be achieved.

A particularly preferred embodiment of the method in accordance with the invention provides that the separation is carried out using a condensation polymerization reaction adapted as a two step condensation polymerization reaction, wherein the condensation polymerization is adapted such that
a) in a first step the compound in accordance with the general formula II is brought to a reaction with a sulfidation agent and a prepolymer of the polyarylene sulfide of the general formula I is produced by condensation polymerization; and
b) in a second step subsequent to the first step a condensation polymerization of the prepolymer is carried out.

In accordance with this embodiment a separation of the substances thus takes place at conditions which in the first step lie above the triple point of iodine and the second step beneath the triple point of iodine.

It is further preferred, when
a) the first separated part of the substances (this means iodine, not reacted reactants and/or mixtures thereof) are supplied to a distillation stage or a condensation stage and liquefy the iodine; and
b) the second part is supplied to a desublimation step and the iodine is desublimated.

Due to the fact that the separation of the first part of the iodine, the di-iodized aromatic compound and/or mixtures thereof, takes place e.g. in the first step of the condensation polymerization reaction at pressures which lie above the pressure which is present at the triple point of iodine, a liquification of the iodine at these said pressure conditions is possible by cooling to a temperature beneath approximately 114° C. (triple point temperature of iodine). In the event that at the same time likewise the di-iodized aromatic compounds are separated off and their melting point lies beneath the temperature at which a cooling in the distillation stage and/or condensation stage takes place the di-iodized aromatic compound is simultaneously liquefied. In the event that the melting point of the di-iodized aromatic compound lies above the temperatures at which the previously described distillation stage and/or condensation stage are cooled a solidification of the di-iodized aromatic compound takes place. In the distillation and/or condensation stage thus a separation of materials of iodine from the aromatic di-iodized compound can take place under some circumstances, in the event that the condensation stage is supplied with mixtures of the aforesaid compounds.

In accordance with this preferred embodiment a desublimation of the iodine likewise takes place which is separated as a second part from the material mixture. Due to the fact that the pressures here lie beneath the pressure of the triple point of iodine (<126 mbar), no liquification of the iodine can no longer take place at these pressure conditions, such that for a cooling below 114° C. a desublimation or solidification of the iodine takes place. In the event that a material mixture is separated which besides iodine also includes di-iodized aromatic compounds in accordance with the general formula II a simultaneous solidification of these compounds likewise takes place if their solid point and/or melting point lies beneath the temperature to which it is cooled in the desublimation step. In the event that its freezing point and/or melting point lies above the temperature achieved in the desublimation step a liquification of the di-iodized aromatic compound with the general formula II takes place, so that at possibly the same time a material separation of iodine and di-iodized aromatic compounds of the formula II can take place, in the event that the desublimation step is supplied a mixture of iodine and compounds of the general formula II.

In accordance with a further preferred embodiment the separation of the first part takes place e.g. in the condensation polymerization
a) at temperatures of the material mixture of 250 to 320° C., preferably of 260 to 320° C. and/or
b) at pressures of 126 to 1200 mbar (absolute pressure), preferably of 126 to 500 mbar (absolute pressure), in particular of 130 to 335 mbar (absolute pressure.

Likewise it is advantageous when the separation of the second part (e.g. in the second step of the condensation polymerization) takes place
a) at temperatures of the material mixture of 285 to 320° C., preferably of 290 to 300° C.; and/or
b) at pressures of 0.01 to <126 mbar (absolute pressure), preferably of 0.1 to 50 mbar (absolute pressure), in particular of 0.2 to 10 mbar (absolute pressure).

Preferred bivalent aromatic radicals A of the compound of the general formula II and/or of the polyarylene sulfide of the formula I are in this connection selected of the group comprising the bivalent aromatic radical A is selected from the group comprising ortho-, meta- or para-phenyl radicals, biphenyl radicals, in particular p,p'-biphenyl radicals, diphenylether radicals, in particular p,p'-diphenylether radicals, naphthyl- and/or benzophenone radicals.

Preferred sulfidation agents by means of which the compound of the general formula II can be transformed in the framework of a condensation polymerization reaction to the polyarylene sulfides in accordance with the formula I are in this connection selected from the group comprising sulfur and/or alkali sulfides, wherein in particular sulfur is preferred.

Subject matter of the present invention is also an apparatus for the manufacture of polyarylene sulfides including at least one repeat unit in accordance with the general formula I

   formula I, (where A represents a bivalent aromatic radical) produced by condensation polymerization of a di-iodized aromatic compound in accordance with the general formula II

   formula II using a sulfidation agent, comprising
a) a precondensation stage comprising an agitating tub or a cascade of agitating tubs composed of a plurality of agitating tubs connected one after the other, wherein the agitating tub and/or the first agitating tub of the cascade of agitating tubs has at least one input possibility for the reactants, and has an outlet for the prepolymer, and downstream of the agitating tub or the cascade of agitating tubs further comprising;

b) a condensation polymerization step comprising at least one condensation polymerization reactor or a cascade of a plurality of condensation polymerization reactors connected one after the other, wherein the condensation polymerization reactor and/or the first condensation polymerization reactor of the cascade of a plurality of condensation polymerization reactors has an input possibility for the prepolymers obtained from the first step and has a output possibility for the condensation polymer, wherein the precondensation stage is connected to the condensation polymeriztion step via a product line, the agitating tub or at least one agitating tub of the cascade of agitating tubs has at least one drainage possibility for gaseous side products and/or not reacted reactants, in particular iodine and/or the compound having the general formula and the condensation polymerization reactor or at least one condensation polymerization reactor of the cascade of condensation polymerization reactors connected one after the other has at least one drainage possibility for gaseous side products and/or non-reacted reactants, in particular iodine and/or the compound of the general formula II.

In accordance with the invention the term "drainage possibility" is understood as a possibility for the draining of gaseous products (exhaust vapor) from the respective agitation tubs and/or condensation polymerization reactors.

By means of the previously mentioned apparatus a condensation polymerization method for the production of polymers, including at least one repeat unit in accordance with the formula I can be carried out in which, in the first step, a prepolymer is generated which is condensed in the second step.

The apparatus in accordance with the invention as well as the associated condensation polymerization method are characterized in that the condensation polymerization reaction for the production of polyarylene sulfides is carried out in multiple steps, wherein initially a precondensate or a prepolymer of the polyarylene sulfides is/are generated and subsequently the actual condensation polymerization to the final product takes place. The used terms prepolymer and/or polyarylene sulfide are in this connection congruent with the previously stated definition.

In this connection the first step is formed from an agitation tub or a cascade of a plurality of agitated tubs connected one after another, wherein the reactants are provided in the first agitation tub and a prepolymer of the arylene sulfide is formed by a condensation reaction of the used starting material.

In the event that a plurality of agitation tubs are used (cascade of agitation tubs) a transport of the prepolymer in the respectively subsequent agitation tub takes place, wherein successively an increase of the polymerization degree and/or of the viscosity of the prepolymers takes place.

Particularly preferred cascades of agitation tubs are, for example, described in the patent applications DE 103 51 085 A1 or DE 101 55 419 A1 whose overall content of disclosure with respect to the cascade of agitation tubs is made the subject matter of this application.

Moreover, the apparatus in accordance with the invention as a condensation polymerization step in a further preferred embodiment comprises a condensation polymerization reactor and/or a cascade of condensation polymerization reactors connected downstream of one another. A corresponding condensation polymerization reactor is e.g. described in the patent application WO 2007/140926 A1 also its entire contents of disclosure is made the subject matter of the present invention with respect to the condensation polymerization reactor.

A preferred embodiment of the apparatus in accordance with the invention provides that at least one drainage possibility of the agitation tub and/or the cascade of agitation tubs opens into a distillation column for the separation by distillation of the gaseous side products and/or the non-reacted reactants, this means that at least one condensation apparatus and/or a distillation column is connected downstream of the agitation tub and/or the cascade of agitation tubs. In this distillation column a purification and/or a separation of the exhaust vapors discharged from the agitation tub and/or the cascade of agitation tubs becomes possible. Insofar, for example, iodine arising during the condensation polymerization can be purified by distillation and can subsequently be further processed, for example, can be desublimated or crystallized. In the event that, besides iodine, also compounds of the general formula II are present a separation of iodine from the compounds in accordance with formula II can take place by means of the distillation column.

It is further advantageous that the distillation column has a feedback of nonreacted reactants into the agitation tub and/or into the first agitation tub of the cascade of agitation tubs. In accordance with this preferred embodiment it is possible to feedback the separated di-iodized aromatic compounds in accordance with formula II, this means the reactant into the agitation tub, this means into the first step of the condensation polymerization. This enables an extremely efficient and economic method guidance.

In a further advantageous embodiment the distillation column has a drain at the head side which is connected to at least one condenser or desublimator via a supply. By means of this condenser, for example, a condensation and/or a desublimation of the iodine vapor present gaseous in the distillation column can take place.

It is further advantageous that the at least one drainage possibility opens into at least one desublimator from the condensation polymerization reactor and/or the cascade of the condensation polymerization reactors connected downstream of one another. In this connection the possibility is included that a plurality of drainage possibilities are present which open into a single desublimator, likewise also the possibility can be given that each drainage possibility opens into a separate desublimator. Since in condensation polymerization reactors conditions are generally present which lie beneath the pressure of the triple point of iodine (this means <126 mbar) no condensation of the iodine vapor present in this example in gaseous state can take place from this step of the condensation polymerization apparatus, but merely a desublimation and/or a solidification can take place. A desublimator can be used for this purpose in accordance with the preferred embodiment of the present invention. The desublimator in this connection has cooled surfaces at which the iodine vapor can solidify. Possibly compounds in accordance with formula II also separated in this connection, in dependence on their solidification point and/or the conditions present in the desublimator, are likewise solidified and/or liquefied.

It is further preferred, when at least one distillation column is connected downstream of the at least one desublimator which is connected to the at least one desublimator via a line and has a head side drain and a sump side drain. By means of such a distillation column a purification of the compound in accordance with the general formula II is further possible.

At the same time the head side drain of the previously mentioned distillation column can open a) into the condenser and/or the desublimator which is connected downstream of the distillation column to the distillation column which in turn is connected downstream of the agitation tub and/or the cascade of agitation tubs, likewise it is however also possible; that b) the head side drain of the distillation columns connected downstream of the desublimator is combined with the product flow stemming from the condenser, which is connected to the distillation column connected downstream of the distillation column which is connected downstream of the agitation tub and/or the cascade of agitation tubs.

It is further preferred when the apparatus in accordance with the invention comprises an apparatus for the generation of vacuum which is, for example, connected to the desublimator connected downstream of the condensation polymerization reactor or to the condenser or to the desublimator which is connected downstream of the distillation column which is connected downstream of the agitation tub or the cascade of agitation tubs of the condensation polymerization reactor. Thereby it is ensured that all volatile substances stemming from the reactors, this means the agitation tubs and/or the cascade of agitation tubs or polymerization reactors, is/are respectively supplied to the distillation column and/or the desublimation units and thus a quasi-complete separation of the volatile side products and/or reactants from the reaction exhaust vapors can be achieved.

The present invention will be described in the following by means of the subsequent descriptions and by the Figures in detail, however, without limiting the invention to the specific parameters illustrated there.

In this connection there is shown

Figure 2:
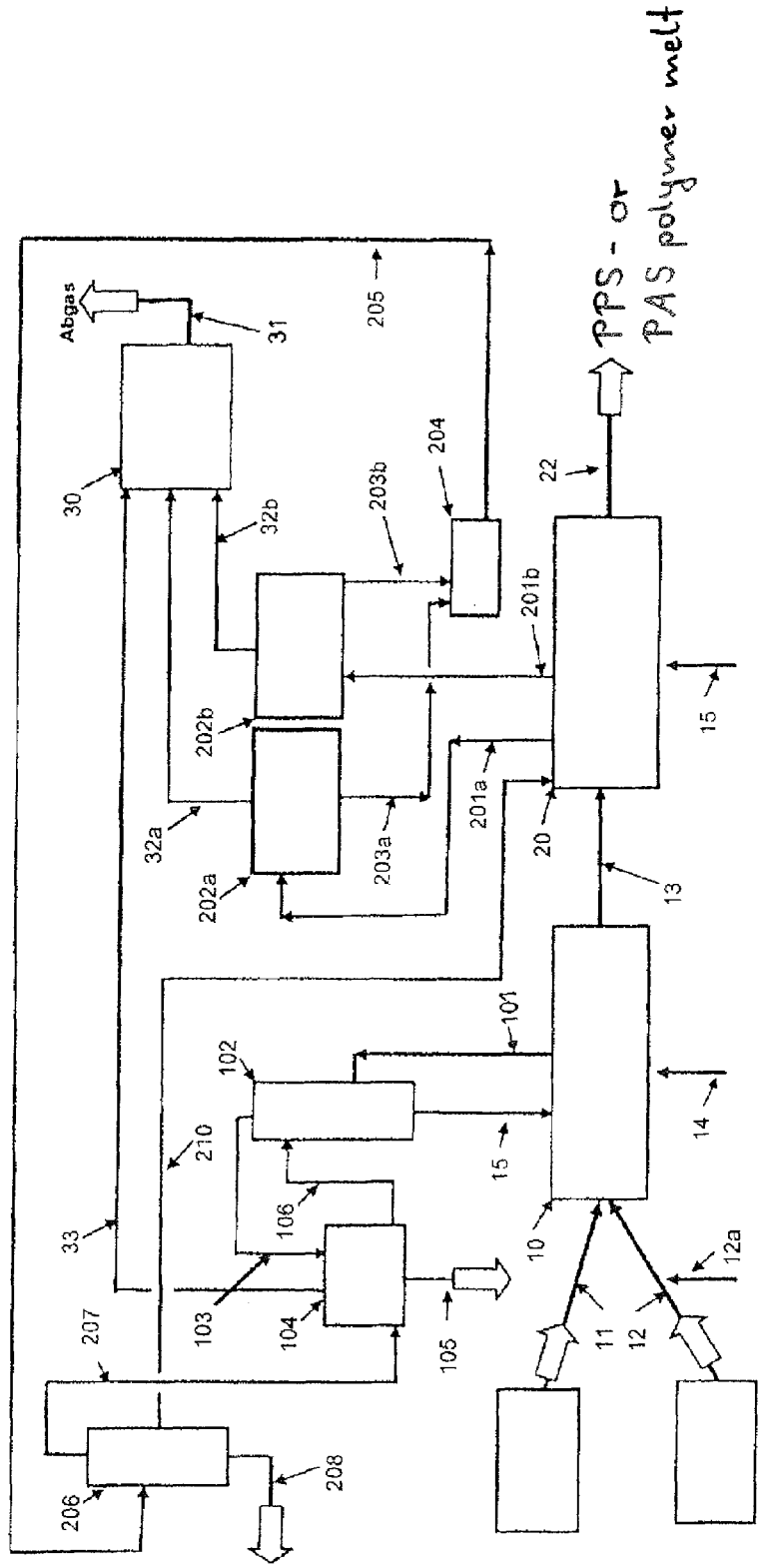

FIG. 1 a first variant of the method guidance in accordance with the invention as well as an associated apparatus for carrying out the method; and FIG. 2 a second variant of the method in accordance with the invention, as well as an apparatus for carrying out this method.

In the following a preparation method is described which, in a highly economic and efficient kind and manner, separates gaseous substances (iodine and di-iodized aromatic compounds in accordance with formula II) either as a solid and/or as a liquid (molten solid) from specific method steps combines these meaningfully and feeds back a few flows into the process, preferably discharges iodine containing flows from the plant.

Particularly for continuous processes the iodine flows and the p-DIB flows must be removed from the process without interruption of the vacuum at vacuums of 0.1 to 300 mbar and also there above, since the final product must be constant with respect to its quality.

For reasons of cost and for energetic reasons the desublimation and/or recovery process components and the plant have to be optimized particularly well with respect to the costs of invest and operating costs.

The "preparation method" is generally characterized in that the gaseous iodine/p-DIB flows exiting at different positions from the main flow are purified and/or discharged and preferably iodine containing flows are separated from the process and p-DIB-containing flows are fed back into the process for the purpose of further reaction;

all iodine/p-DIB gas flows which lie above the triple point of iodine are initially condensed and/or rectified;

all those iodine/p-DIB gas flows which lie beneath the triple point of iodine are discharged from the method are initially solidified by means of specific desublimators and are subsequently liquefied in a further step thereafter above the triple point;

it is thereby enabled to completely meaningfully combine the different iodine/p-DIB flows and to separate these by means of specific separation operations such as e.g. rectification below over-pressure up to and down to vacuum and to add or to discharge at corresponding positions of the method.

FIG. 1 shows a flow diagram of a method guidance in accordance with the invention in which also an apparatus in accordance with the present invention is used. The reactants sulfur and, for example, para-di-iodobenzene are supplied from corresponding storage containers via supply lines 11 and/or 12 to an agitation tub 10 as a first step of the condensation polymerization reaction. This first step is carried out at relatively high pressures, this means pressures of >126 mbar. In the agitation tub 10 and/or in a corresponding cascade of agitation tubs the reactants sulfur and p-DIB are converted to a prepolymer with relatively low viscosity. Elemental iodine arises as a side product during the condensation polymerization reaction. Additives, such as e.g. catalysts can be introduced at suitable positions via supply lines 14, e.g. into the supply lines 11 or 12, the agitation tub 10 or the condensation polymerization reactors 20a and/or 20b. The agitation tub 10 has a drain 101 via which the accruing iodine as well as e.g. non-reacted p-DIB can be supplied to a distillation column 102. In the distillation column 102 a separation of the iodine and of the p-DIB takes place, which p-DIB can be fed back to the agitation tub 10 via a supply line 15, for example, as a product discharged sump side and can thus be recycled. The iodine can be discharged at the head side via a drain 103 and can be supplied to a condenser 104 where a corresponding condensation of the iodine to molten iodine can take place.

The agitation tub 10 is in this connection operated at temperatures at which iodine is present in the gaseous state at the corresponding pressures of ≥126 mbar and can thus be correspondingly easily removed from the accruing prepolymers. The prepolymer is supplied via a connection line 13 to a condensation polymerization reactor which in the case of the example illustrated in FIG. 1, is of two-step design and which has a first condensation polymerization reactor 20a and a second condensation polymerization reactor 20b. The condensation polymerization reactors are connected to one another via a melt line 21. Alternatively, the two reactors 20a and 20b can also be formed as a unit in which the corresponding steps are separated internally from one another. In the consecutive condensation polymerization reactors 20a and 20b a build-up of the degree of polymerization of the corresponding polyarylene sulfide, for example of the polyphenyl sulfide (PPS) takes place. In this connection iodine again arises as a gaseous side product and/or not yet reacted p-DIB can be included in the arising polymer melts. Both condensation polymerization reactors 20a and 20b have drains 201 and 201' via which the gaseous products can be supplied from the respective condensation polymerization reactors 20a and/or 20b to a desublimator 202. Likewise the possibility is given that a plurality of desublimators are connected one after another in order to increase the separation performance. Since pressures are present in the condensation polymerization reactors 20a and 20b which lie beneath the pressure present at the triple point of iodine (<126 mbar) no solidification of the iodine separated from the reactors 20a and 20b in the gaseous aggregate state is no longer possible under these conditions; merely a solidification and/or desublimation of the iodine can still take place. In the desublimator 202 thus a separation of iodine as a solid substance at, for example, cooled parts of the desublimator with which the iodine flows withdrawn from the reactors 20a and 20b come into contact takes place. The pressures in the condensation polymerization reactors 20a and 20b are in this connection set in such a way that lower pressure conditions are present in the reactor 20b than in the reactor 20a. The final polymer melt can take place via a output possibility 22 from the reactor 20b. Iodine separated in the desublimator 202 can be supplied via an output possibility and a supply line 205 to a further column 206 where a separation by means of distillation of the iodine at suitable pressure conditions at which the iodine undergoes a phase transition from liquid to gaseous can take place. In this connection iodine is discharged as a gaseous head side product 207 and is withdrawn and can be extracted for the external recyIcing of the column. In this connection likewise a combination of this flow 207 with the iodine flows 103, extracted from the distillation column 102 and condensed in the condenser 104 is possible, wherein a line 105 is combined with the head side extraction possibility 207 of the column 206 from the condenser. Instead of the condenser 104 also a desublimator can be provided. The combined iodine flows 209 can thus be supplied to an external recycling. Likewise it is possible that the iodine flow 207 extracted at the head side of the column 206 is supplied to the condenser 104 in order to initially achieve a liquification of the iodine there. The column 206 at the sump side has a further outlet 208 for side products or reactants, such as for example p-DIB. The extraction of the iodine separated in the desublimator 202 can, for example, take place thereby that the temperature in the desublimator is time-wise increased so that again a phase transition from solid to gaseous of the iodine separated there takes place and thus a gaseous iodine flow can be provided in the column 206 via the supply line 205. Alternatively or additionally it is also possible to increase the pressures so that iodine separated in the desublimator 202 can run through a phase transition from solid to liquid so that a liquid iodine flow can be supplied to the column 206 in the supply line 205. Moreover the apparatus in accordance with the invention in accordance with the example in FIG. 1 has an apparatus for the generation of a vacuum 30 which is connected to the desublimator 202 and/or to the condenser 104 via corresponding vacuum lines 32 and 33. The apparatus for the generation of the vacuum 30 moreover has an outlet for exhaust gases 31.

FIG. 2 shows a further embodiment of the apparatus in accordance with the invention in which like components as are illustrated in FIG. 1 are provided with the same reference numerals. Also the apparatus in accordance with FIG. 2 has an agitation tub 10 with supply lines 11 for sulfur and supply lines 12 for p-DIB, wherein, for example, in the supply line 12 and/or the agitation tub 10 further additives and/or catalysts can still be supplied via supply lines 12a and/or 14. A condensation polymerization of the reactants to a prepolymer takes place in the agitation tub 10. In analogy to FIG. 1 also the agitation tub 10 in accordance with FIG. 2 has a drain 101 and is connected to a distillation column 102. The prepolymer is supplied via a supply line 13 to a condensation polymerization reactor 20 designed as a multistep condensation polymerization reactor which has drains 201a and 201b at different positions for gaseous side products such as, for example, iodine and/or reactants, such as, for example p-DIB. These drains 201a and 201b respectively lead to a desublimator 202a and/or 202b. The desublimators 202a and 202b are connected to an apparatus 30 for the generation of vacuum via respectively separate vacuum lines 32a and/or 32b. The iodine flows from the desublimators 202a and/or 202b are respectively supplied to a collector 204 via a supply line 203a and/or 203b and from there are supplied to a downstream distillation column 206 via a supply line 205. The iodine flow 207 extracted at the head side is condensed and/or solidified in a condenser 104 and/or a desublimator together with that extracted from the distillation column connected downstream of the first step 10 and can, for example, be extracted as a so-called collected iodine flow 105 and/or as solid iodine. For the further purification likewise a feedback 106 into the column 102 is possible. Moreover, the column 206 can have a further drain 210 via which, for example, p-DIB purified there can initially again be supplied to the condensation polymerization reactor 20. However, likewise also a discharge into the condensation polymerization reactor 10 is possible.

The invention claimed is:

1. A method for producing a polyarylene sulfide including at least one repeat unit of the following general formula I, the method comprising:
    performing a condensation of a di-iodized aromatic compound of the following general formula II using a sulfidation agent,
    wherein a material mixture comprising iodine and/or the at least one di-iodized aromatic compound of the general formula II is separated during the condensation step by a method, characterized in that
    a) a first part of the material mixture is separated at a pressure which is equal to or larger than the pressure which is present at the triple point of iodine; and
    b) a second part of the material mixture is separated at a pressure which is smaller than the pressure which is present at the triple point of iodine;
    wherein in both steps a) and b), the material mixture respectively has temperatures at which at least iodine is present in a gaseous state at the said pressures:

$$\mathrm{-\!\!\!+\!\!A\text{-}S\!\!+\!\!\!-} \quad \text{Formula I}$$

$$\text{I-A-I} \quad \text{Formula II}$$

In the Formulae I and II, A represents a bivalent aromatic radical.

2. The method in accordance with claim 1, wherein the condensation step comprises:
    reacting the compound of the general formula II using the sulfidation agent to produce a prepolymer of the polyarylene sulfide of the general formula I; and
    condensation polymerizing the prepolymer.

3. The method in accordance with claim 2, wherein the separation of the material mixture is performed during each of the steps of producing the prepolymer and polymerizing the prepolymer.

4. The method in accordance with claim 3, wherein the step of producing the prepolymer and the separation of the first part therein takes place at
    a) the temperature of the material mixture of 250 to 320° C.; and/or
    b) at the pressure of ≥126 mbar (absolute pressure).

5. The method in accordance with claim 3, wherein the step of polymerizing the prepolymer and the separation of the second part therein takes place at
   a) the temperature of the material mixture of 285 to 320° C.; and/or
   b) at the pressure of <126 mbar (absolute pressure).

6. The method in accordance with claim 2, wherein the steps of producing the prepolymer and polymerizing the prepolymer are continuously performed, and
   the separation of material mixture is performed during each of the steps of producing the prepolymer and polymerizing the prepolymer, thereby continuously separating and draining the first and the second parts of the material mixture, respectively.

7. The method in accordance with claim 2, wherein the first and/or the second parts of the separated material mixture are recycled to and re-used in the step of the producing the prepolymer.

8. The method in accordance with claim 7, wherein the di-iodized aromatic compound of the general formula II in the first parts of the separated material mixture is recycled to and re-used in the step of the producing the prepolymer.

9. The method in accordance with claim 1, wherein the first part of the separated material mixture is distilled and condensed, and liquefied.

10. The method in accordance with claim 1, wherein the second part of the separated material mixture is desublimated and distilled.

11. The method in accordance with claim 1, wherein the condensation step including the separation of the iodine is performed in a reactor.

12. The method in accordance with claim 1, wherein the di-iodized aromatic compound of the following general formula II has at least one bivalent aromatic radical A selected from the group consisting of ortho-phenylene radical, meta-phenylene radical, para-phenylene radical, biphenylene radical, diphenylether radical, naphthylene radical and benzophenone radical.

13. The method in accordance with claim 1, wherein the sulfidation agent is sulfur or alkali sulfide.

14. The method in accordance with claim 2, wherein the prepolymer and the polyarylene sulfide include the repeat units of the general formula I, and at least one end of the repeat units are terminated with hydrogen.

15. The method in accordance with claim 2, wherein the prepolymer has a viscosity of 0.1 to 10 Pas and the polyarylene sulfide has a viscosity of 15 to 400 Pas.

* * * * *